United States Patent
Tsuruta et al.

[11] Patent Number: 6,037,736
[45] Date of Patent: Mar. 14, 2000

[54] APPARATUS FOR DETERMINATION OF CONTROL CONSTANT

[75] Inventors: Kazuhiro Tsuruta; Hiroshi Nakamura, both of Fukuoka, Japan

[73] Assignee: Kabushiki Kaisha Yaskawa Denki, Kitatyushu, Japan

[21] Appl. No.: 08/952,541

[22] PCT Filed: May 13, 1996

[86] PCT No.: PCT/JP96/01253

§ 371 Date: Nov. 17, 1997

§ 102(e) Date: Nov. 17, 1997

[87] PCT Pub. No.: WO96/37039

PCT Pub. Date: Nov. 21, 1996

[30] Foreign Application Priority Data

| May 17, 1995 | [JP] | Japan | 7-143869 |
| Dec. 20, 1995 | [JP] | Japan | 7-349586 |
| Apr. 19, 1996 | [JP] | Japan | 8-098509 |

[51] Int. Cl.[7] .................................. G05B 11/36
[52] U.S. Cl. ..................... 318/609; 318/615; 318/616
[58] Field of Search ................. 310/560, 632, 310/432, 434, 430

[56] References Cited

U.S. PATENT DOCUMENTS

| 4,851,754 | 7/1989 | Sakamoto et al. | 318/616 |
| 5,073,746 | 12/1991 | Sakamoto et al. | 318/560 |
| 5,091,684 | 2/1992 | Iwashita | 318/616 |

FOREIGN PATENT DOCUMENTS

| 61-88780 | 5/1986 | Japan . |
| 2-101981 | 4/1990 | Japan . |
| 4-325886 | 11/1992 | Japan . |
| 5-346359 | 12/1993 | Japan . |
| 6-70566 | 3/1994 | Japan . |
| 6-195128 | 7/1994 | Japan . |
| 6-225564 | 8/1994 | Japan . |
| 6-225565 | 8/1994 | Japan . |
| 8-15058 | 1/1996 | Japan . |

*Primary Examiner*—David Martin
*Attorney, Agent, or Firm*—Morgan, Lewis & Bockius LLP

[57] ABSTRACT

A control constant identification system which comprises a command generation section for generating a speed command Vref, a speed control section for determining a torque command Tref by the speed command Vref and actual motor speed Vfb and controlling motor speed, an estimation section for simulating the speed control section according to a model and outputting an estimated torque command Tref', and an identification section for identifying inertia J according to a ratio between a value STref resulting from time integration of the torque command Tref output by the speed control section at a predetermined interval [a, b] and a value STref' resulting from time integration of the torque command Tref' output by the estimation section at the predetermined interval [a, b]. To accurately find the inertia J by executing a small amount of operations, the predetermined interval [a, b] and the speed command Vref are set so that the actual motor speed Vfb and motor speed Vfb' found by the estimation section become the same non-zero values at the time b.

14 Claims, 4 Drawing Sheets

APPARATUS FOR DETERMINATION OF CONTROL CONSTANT

TECHNICAL FIELD

This invention relates to a control system of a motor for driving a machine tool, etc., and in particular to a control system for identifying control constants such as inertia and viscous friction coefficients.

TECHNICAL BACKGROUND

For example, control constant identification systems include:

(1) an identification system which changes a torque command for changing the rotation speed and calculates torque command integration amount and rotation speed change width, then performs an operation of (inertia)=(torque command integration amount)/(rotation speed change width) for finding inertia (see Japanese Patent Unexamined Publication No. Sho 61-88780);

(2) an identification system which inputs a speed command having a lamp section, executes a speed loop under P control, and finds load inertia from the ratio between steady speed deviation in a state in which no load inertia exists and that in a state in which load inertia exists (see Japanese Patent Unexamined Publication No. Hei 6-70566); and (3) an identification system which time-integrates actual and simulated current detection values or current command values for finding a current area and corrects an initial inertia assumption value from the current area calculation result, thereby finding inertia (see Japanese Patent Unexamined Publication No. Hei 4-325886).

However, conventional examples (1), (2), and (3) have a problem that inertia identification value errors or variations are large if viscous friction or Coulomb's friction exists. The following problems are also involved: Particularly in (1), commands are limited to those for changing the rotation speed at a given rate; in (2), the effect of disturbance is easily received because integration control is not performed; and in (3), inertia is found while fuzzy inference, etc., is used to repeat a correction so that the initial inertia assumption value approaches the actual inertia, thus resulting in large amounts of complicated operations.

DISCLOSURE OF THE INVENTION

It is an object of the invention to provide a control constant identification system that can solve the problem.

To solve the problems, according to the invention, there is provided a control constant identification system comprising:

a command generation section for generating a speed command Vref;

a speed control section for determining a torque command Tref by the speed command Vref and actual motor speed Vfb and controlling motor speed;

an estimation section for simulating the speed control section according to a model and outputting an estimated torque command Tref'; and an identification section for identifying inertia J according to a ratio between a value STref resulting from time integration of the torque command Tref output by the speed control section at a predetermined interval [a, b] and a value STref' resulting from time integration of the torque command Tref' output by the estimation section at the predetermined interval [a, b], characterized in that the predetermined interval [a, b] and the speed command Vref are set so that the actual motor speed Vfb and motor speed Vfb' found by the estimation section become the same non-zero values at the time b.

According to the invention, the control constant control system can be provided which contains small inertia identification value errors and variations and moreover can find inertia by performing a small amount of very easy operations even if viscous friction, constant disturbance, and Coulomb's friction exist.

BEST MODE FOR CARRYING OUT THE INVENTION

Figure 1:
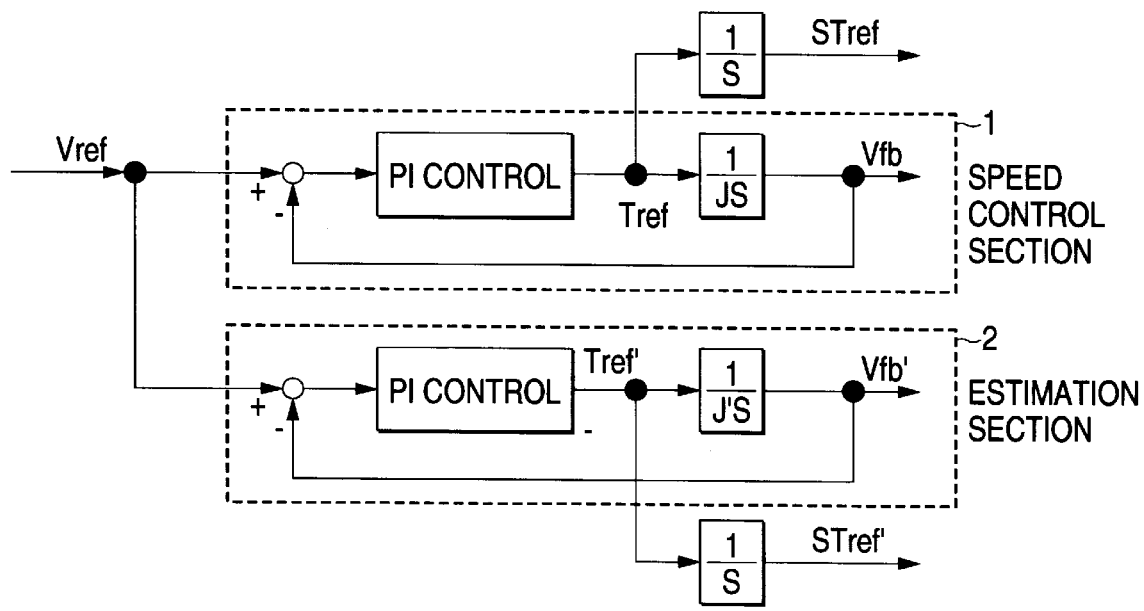
FIG. 1 is a principle diagram to explain the basic concept of the invention.

First, the principle of the invention will be discussed, next an embodiment using a motor will be described specifically. FIG. 1 is a principle diagram to explain the basic concept of the invention. Numeral 1 is a speed control section and numeral 2 is an estimation section. PI control is programmed in the speed control section 1 and only inertia J is to be controlled. Likewise, PI control is also programmed in the estimation section 2 and only inertia J' is to be controlled. In FIG. 1, if speed Vfb in the speed control section 1 matches speed Vfb' in the estimation section and Vfb and Vfb' are not zero, relation J/J'=STref/STref' . . . (1) holds for torque command integration value STref and inertia J in the speed control section and torque command integration value STref' and inertia J' in the estimation section, and inertia J is immediately found from J=(STref/STref')*J' . . . (2). This is the basic principle of the invention.

Figure 2:
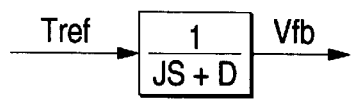
FIG. 2 is a block diagram to elaborate on the principle of the invention.
Figure 3:
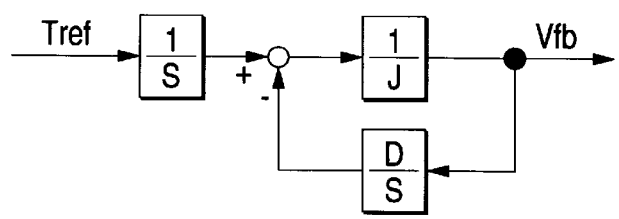
FIG. 3 is a block diagram to elaborate on the principle of the invention.

However, in a system in which viscous friction D exists, the viscous friction D cannot be ignored and to make the relation hold, a condition that the integration value of speed Vfb at a predetermined interval [a, b] is zero must be added. The reason why the condition must be added is as follows: FIG. 2 is a block diagram where the targets to be controlled are represented as inertia J and viscous friction D. FIG. 3 is a block diagram provided by rewriting FIG. 2. As seen in FIG. 3, if the integration value of speed Vfb at the interval [a, b] is zero, the effect of the viscous friction D can be eliminated. Thus, if the condition is added, expression (1) holds and the inertia J can be found immediately from expression (2). Here, the integration value of speed Vfb is zero, but if positions are managed, the effect of the viscous friction D may be eliminated if the positions at time a and time b at the interval [a, b] match. An average value of inertia found at a plurality of such intervals at which the time integration value of motor speed Vfb becomes zero may be adopted as inertia J. Next, when constant disturbance Td is applied, if an average value of inertia J1 found by one speed command Vref1 and inertia J2 found by Vref2 provided by inverting the positive and negative of the speed command Vref1 is adopted as inertia J, the effect of the constant disturbance Td can be eliminated. When Coulomb's friction exists, if the interval [a, b] and the speed command Vref are set so that the forward rotation time and the reverse rotation time of a motor become equal to each other at the interval [a, b], the effect of the Coulomb's friction can also be eliminated. The constant disturbance Td can be found by dividing an average value of torque command integration value STref1 found by the speed command Vref1 and torque command integration value STref2 found by Vref2 provided by inverting the positive and negative of the speed command Vref1 by integration time b-a. The viscous friction D can be found from the inclination (time change) of torque command Tref when the speed command Vref is constant acceleration or constant deceleration.

Figure 4:
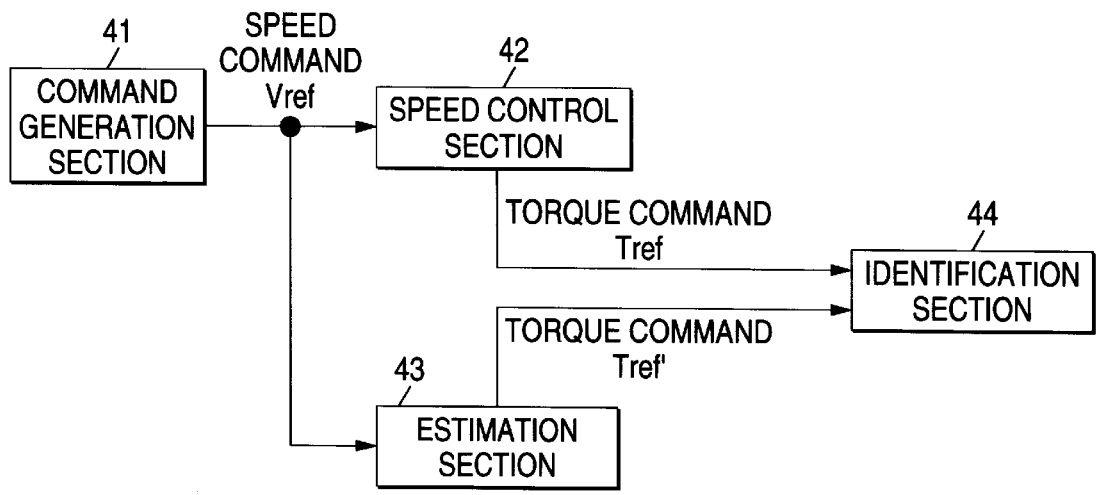
FIG. 4 is a block diagram of an embodiment of the invention.
Figure 5:
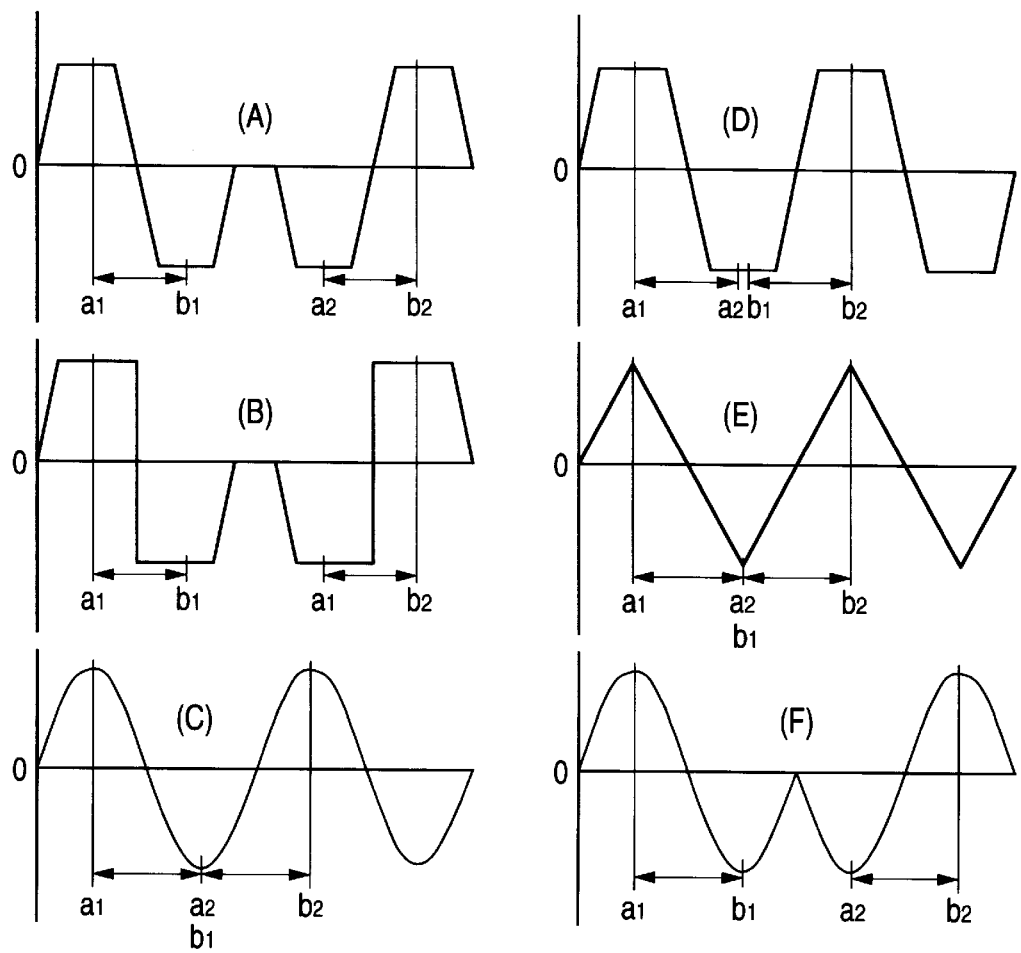
FIGS. 5A–5F are speed command examples.
Figure 6:
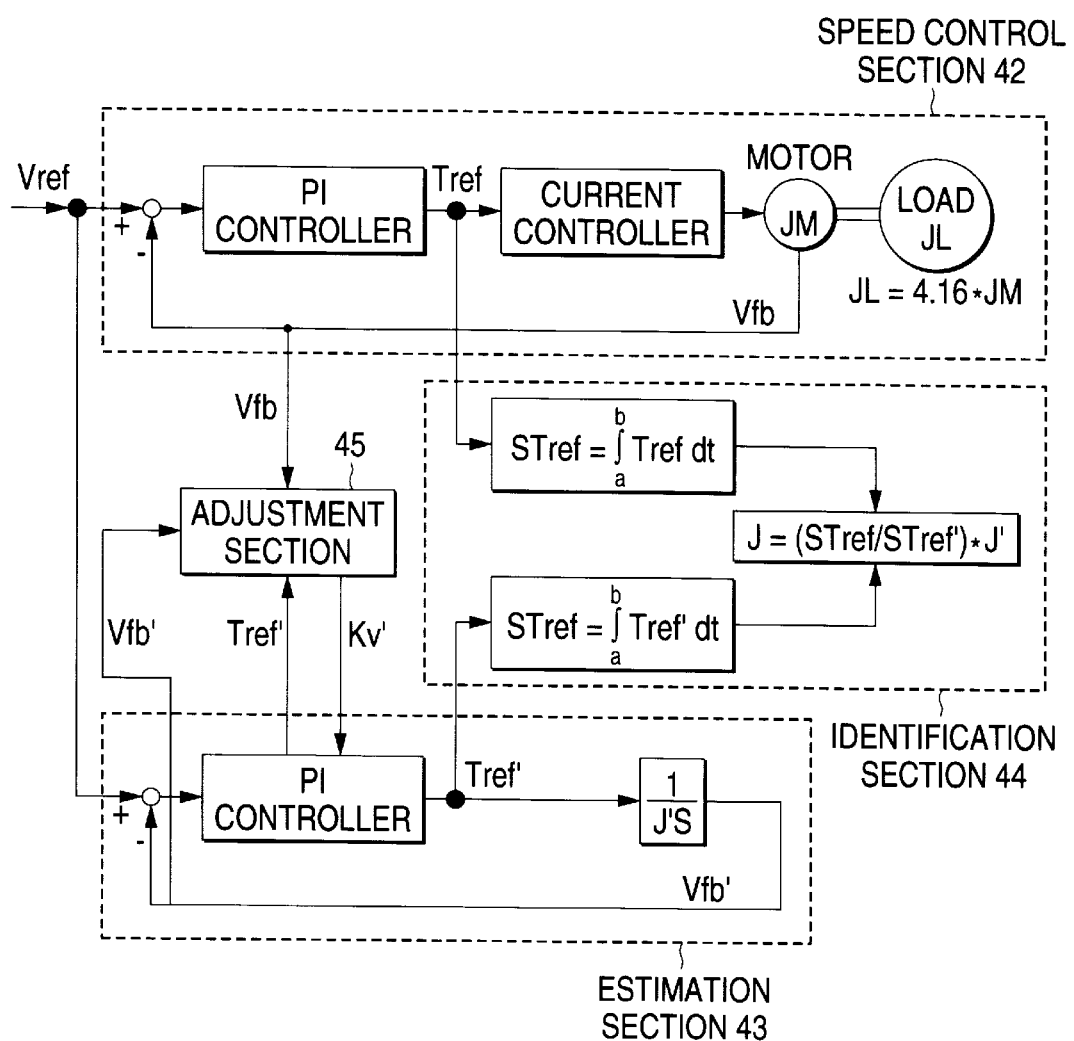
FIG. 6 is a block diagram to show the speed control section, the estimation section, and the identification section in FIG. 4 in detail.
Figure 7:
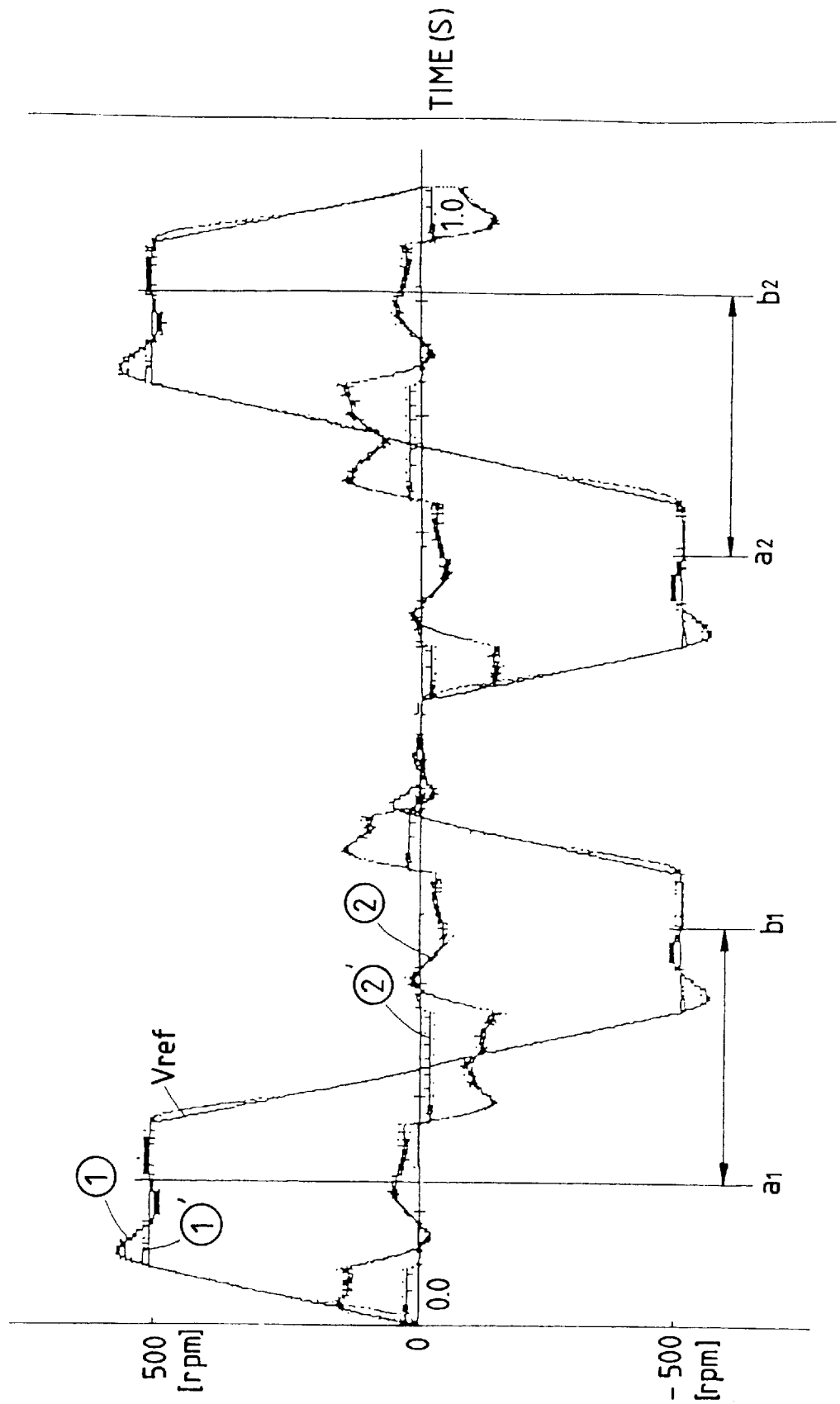
FIG. 7 is an operation example using an AC servo motor.

Next, an embodiment using a motor will be described specifically. FIG. 4 is a block diagram of an embodiment of the invention. In the figure, numeral 41 is a command generation section for outputting a speed command Vref to a speed control section 42 and an estimation section 43. Numeral 44 is an identification section for inputting a torque command Tref of the speed control section 42 and a torque command Tref' of the estimation section 43 and finding inertia J, constant disturbance D, and viscous friction D. Next, the sections will be discussed with reference to FIGS. 5 and 6 based on an experimental configuration. FIG. 7 shows an operation example using an AC servo motor. The command generation section 41 generates a speed command Vref. The speed command Vref can be any of commands as shown in FIGS. 5(A)–5(F), for example. Here, speed command Vref shaped like a trapezoid where the absolute values of the maximum speed and the minimum speed are the same and acceleration and deceleration are the same as shown in FIG. 5(A) is adopted. FIG. 6 shows the configuration of the speed control section 42, the estimation section 43, and the identification section 44. The speed control section 42 programs a speed loop so that speed Vfb matches the speed command Vref; here PI (proportional integration) control is adopted. The speed control section 42 outputs a torque command Tref to a current controller for driving a motor and the identification section 44. Assume that load 4.16 times that of motor inertia JM, JL (=4.16*JM), is attached to the motor and that speed Vfb is output from the motor. Like the speed control section 42, the estimation section 43 adopts PI control, models a control target as 1/J'S, and outputs a torque command Tref' to the control target 1/J'S and the identification section 44. The identification section 44 receives the torque command Tref output from the speed control section 42 and the torque command Tref' output from the identification section 43 and finds inertia J according to J=(STref/STref')*J' from values STref and STref' resulting from time integration of the torque commands between time "a" and time "b" and inertia J' of the estimation section.

FIG. 7 provides an operation example using an AC servo motor. Vref is a speed command, $\hat{1}$ is motor speed Vfb in the speed control section 42, $\hat{1}'$ is speed Vfb' in the estimation section, $\hat{2}$ is a torque command Tref in the speed control section 42, and $\hat{2}'$ is a torque command Tref' in the estimation section. When inertia J1 is found from values STref1 and STref1' resulting from time integration of $\hat{2}$ and $\hat{2}'$ between time a1 and time b1 and inertia J' of the estimation section, J1=(STref1/STref1')*J'=5.49*JM. Likewise, when inertia J2 is found from values STref2 and STref2' resulting from time integration between time a2 and time b2 and inertia J' of the estimation section, J2=(STref2/STref2')*J'= 4.81*JM. Thus, inertia J can be identified as J=(J1+J2)/2= 5.15*JM. This identification value almost matches (motor inertia JM)+(load inertia JL=4.16*JM)=5.16*JM. However, inertia J' of the estimation section is simulated as J'=JM. In the experiment, the operations of the estimation section are also performed in real time. However, if the speed command Vref is fixed, the torque command integration value STref in the estimation section can be previously calculated, thus only the torque command integration value STref in the speed control section 42 needs to be calculated.

In fact, if the speed becomes zero, the relation of expression (1) does not hold because of the effect of statical friction. Therefore, when the speed Vfb is X1≦Vfb>X2 (where X1≦0 and X2≧0), if time integration of the torque command Tref of the speed control section and the torque command Tref' of the estimation section is not executed, J/J'=STref/STref' holds and inertia J is immediately found from expression J=(STref/STref')*J'. When viscous friction D exists as in FIG. 2, as seen in FIG. 3 provided by rewriting FIG. 2, if the integration value of the speed vfb at the interval [a, b] is zero, the effect of the viscous friction D can be eliminated. Thus, when the speed Vfb is X1≦Vfb≦X2 (where X1≦0 and X2≧0), if time integration of the torque command Tref of the speed control section and the torque command Tref' of the estimation section is not executed and the interval [a, b] and the speed command Vref are set so that the time integration value of the speed Vfb becomes zero except during the time t1 (t1≧0) when the speed Vfb is X1≦Vfb≦X2, the effect of the viscous friction D can also be eliminated. Thus, a control constant control system can be provided that can identify inertia without receiving the effect of statical friction, etc., occurring when the speed is zero or is close to zero.

If the actual operation and the model operation differ largely, the speed Vfb in the speed control section and the speed Vfb' in the estimation section may be hard to match. In this case, an adjustment section 45 for adjusting speed loop gain Kv' may be provided, as shown in FIG. 6.

The adjustment section raises the speed loop gain Kv' of the estimation section if the torque command Tref' of the estimation section is greater than 0 and the speed Vfb is greater than the speed Vfb';

lowers the speed loop gain Kv' of the estimation section if the torque command Tref' of the estimation section is less than 0 and the speed Vfb is greater than the speed Vfb'; and raises the speed loop gain Kv' of the estimation section if the torque command Tref' of the estimation section is less than 0 and the speed Vfb is less than the speed vfb'.

FIELD OF INDUSTRIAL APPLICATION

This invention can be applied to control systems of motors for driving industrial machines, particularly machine tools, sorting machines, etc., with less load change.

What is claimed is;:

1. A control constant identification system for identifying control constants for a control system of a motor, comprising:

a command generation section for generating a speed command Vref;

a speed control section for controlling motor speed and for determining a torque command Tref based upon the speed command Vref and an actual motor speed Vfb;

an estimation section for simulating the operation of the speed control section according to a model and determining an estimated torque command Tref' and an estimated motor speed Vfb'; and an identification section for identifying an inertia J according to a ratio between a first value STref, derived from a time integration of the torque command Tref that is output from the speed control section at a predetermined time interval, and a second value STref', derived from a time integration of the torque command Tref' that is output from the estimation section at the predetermined time interval, wherein the predetermined interval and the speed command Vref are set such that the actual motor speed Vfb and an estimated motor speed Vfb' that is determined by the estimation section become the same non-zero values at the end of the predetermined time interval.

2. The control constant identification system according to claim 1, wherein the speed command Vref generated by the command generation section is previously fixed.

3. The control constant identification system according to claim 1, wherein the speed control section performs an integration operation.

4. The control constant identification system according to claim 1, wherein the predetermined time interval and the speed command Vref are set such that a time integration value of the actual motor speed Vfb at the predetermined interval becomes zero.

5. The control constant identification system according to claim 1, wherein an average value of inertia found at a plurality of such predetermined time intervals at which the time integration value of the actual motor speed Vfb becomes zero is inertia J.

6. The control constant identification system according to claim 1, wherein the predetermined time interval and the speed command Vref are set such that forward rotation time and reverse rotation time of a motor become equal to each other at the predetermined time interval.

7. The control constant identification system according to claim 1, wherein an average value of inertia J1, based upon a speed command Vref1, and an inertia J2, based upon a speed command Vref2 provided by inverting positive and negative of the speed command Vref1, is the inertia J.

8. The control constant identification system according to claim 7, wherein a disturbance constant Td is determined according to a torque command integration value STref1 based on the speed command Vref1 and a torque command integration value STref2 based on the speed command Vref2 provided by inverting the positive and negative of the speed command Vref1.

9. The control constant identification system according to claim 1, wherein a viscous friction coefficient D is determined from inclination of the torque command Tref when the speed command Vref is constant acceleration or constant deceleration.

10. The control constant identification system according to claim 1, wherein when the actual motor speed Vfb is a real number, which satisfies the following relationship, in the predetermined time interval: $X1 \leq Vfb \leq X2$ (where $X1 \leq 0$ and $X2 \geq 0$), time integration of both the torque command Tref of the speed control section and the torque command Tref' of the estimation section are not executed.

11. The control constant identification system according to claim 10, wherein the predetermined time interval and the speed command Vref are set such that a time integration value of the actual motor speed Vfb becomes zero except during a time t1 ($t1 \geq 0$) when the actual motor speed Vfb is a real number which satisfies the following relationship: $X1 \leq Vfb \leq X2$ (where $X1<0$ and $X2>0$).

12. The control constant identification system according to claim 1, further including an adjustment section for adjusting speed loop gain Kv' of the estimation section from information of the motor speed Vfb of the speed control section, and the estimated motor speed Vfb' and the torque command Tref' of the estimation section.

13. The control constant identification system according to claim 12, wherein the adjustment section raises the speed loop gain Kv' of the estimation section if the torque command Tref' of the estimation section is greater than 0 and the actual motor speed Vfb is greater than the estimated motor speed Vfb';

the adjustment section lowers the speed loop gain Kv' of the estimation section if the torque command Tref' of the estimation section is less than 0 and the actual motor speed Vfb is greater than the estimated motor speed Vfb'; and the adjustment section raises the speed loop gain Kv' of the estimation section if the torque command Tref' of the estimation section is less than 0 and the speed actual motor speed Vfb is less than the estimated motor speed Vfb'.

14. A control constant identification system for identifying control constants for a control system of a motor, comprising:

a command generation section for generating a speed command Vref;

a speed control section for controlling motor speed and for determining a torque command Tref based upon the speed command Vref and an actual motor speed Vfb;

an estimation section for simulating the operation of the speed control section according to a model and determining an estimated torque command Tref' and an estimated motor speed Vfb'; and an identification section for identifying an inertia J according to a ratio between a first value STref, derived from a time integration of the torque command Tref that is output from the speed control section at a predetermined time interval, and a second value STref', derived from a time integration of the torque command Tref' that is output from the estimation section at the predetermined time interval, wherein when the actual motor speed Vfb is a certain value at a certain time within the predetermined time interval, the speed command Vref is set such that a time integration value of the actual motor speed Vfb is zero except during the certain time, and the inertia J is identified in the identification system without an effect of viscous friction.

* * * * *